United States Patent
Lineweber et al.

(10) Patent No.: US 10,104,265 B2
(45) Date of Patent: Oct. 16, 2018

(54) METHOD AND DEVICE FOR GENERATING A PRIVATIZED ELECTRONIC IMAGE FOR A PLURALITY OF ELECTRONIC DOCUMENTS

(71) Applicant: Email Data Source, Inc., New York, NY (US)

(72) Inventors: Dustin Lineweber, Lincoln, NE (US); Christopher Adams, Kansas City, MO (US)

(73) Assignee: Email Data Source, Inc., New York, NY (US)

( * ) Notice: Subject to any disclaimer, the term of this patent is extended or adjusted under 35 U.S.C. 154(b) by 183 days.

(21) Appl. No.: 15/136,132

(22) Filed: Apr. 22, 2016

(65) Prior Publication Data

US 2016/0316097 A1    Oct. 27, 2016

Related U.S. Application Data

(60) Provisional application No. 62/151,087, filed on Apr. 22, 2015.

(51) Int. Cl.

| G06K 9/00 | (2006.01) |
| H04N 1/32 | (2006.01) |
| H04L 12/58 | (2006.01) |
| G06T 1/00 | (2006.01) |
| G06T 11/60 | (2006.01) |
| G06F 17/21 | (2006.01) |

(52) U.S. Cl.
CPC ....... *H04N 1/32267* (2013.01); *G06F 17/211* (2013.01); *G06T 1/0028* (2013.01); *G06T 11/60* (2013.01); *H04L 51/063* (2013.01); *G06T 2201/0051* (2013.01)

(58) Field of Classification Search
None
See application file for complete search history.

(56) References Cited

U.S. PATENT DOCUMENTS

| 7,587,063 | B2* | 9/2009 | Hwang | G06T 1/005 382/100 |
| 2002/0105679 | A1* | 8/2002 | Haynes | G06T 1/0064 358/3.28 |
| 2006/0149810 | A1* | 7/2006 | Koo | G06Q 20/0453 709/203 |
| 2011/0038012 | A1* | 2/2011 | Massicot | H04N 1/32133 358/3.28 |
| 2016/0316097 | A1* | 10/2016 | Lineweber | G06F 17/211 |

* cited by examiner

*Primary Examiner* — Tahmina Ansari
(74) *Attorney, Agent, or Firm* — Millen, White, Zelano & Branigan, P.C.; William Nixon

(57) ABSTRACT

A set of electronic documents, such as emails, may include private information. A privatized image is generated to represent the set of electronic documents by identifying probable-pixel and proven-pixel locations within a subset of images. The subset of images is used to create blurred and obfuscated image having the private information distorted.

18 Claims, 16 Drawing Sheets

METHOD AND DEVICE FOR GENERATING A PRIVATIZED ELECTRONIC IMAGE FOR A PLURALITY OF ELECTRONIC DOCUMENTS

FIELD OF THE INVENTION

The present invention relates to generating a representative electronic document for a plurality of electronic documents, such as emails, having private information. The electronic document is privatized to prevent the private information from being visible.

BACKGROUND OF THE RELATED ART

Privacy issues from mass email campaigns arise when personal or private information is included within large amounts of emails. Such private information may include name, email address, information specific to the recipient and information attached to the email meant only for the recipient, such as an image. Current processes may mask out this information by blacking or whiting out the information. These processes, however, take away from the look and feel of the email presentation, or do not allow any visual information about the email. These problems also extend to electronic documents needed for companies, government agencies, and the like. The stored documents include private information that should be redacted for storage.

SUMMARY OF THE INVENTION

A method for generating a privatized image corresponding to a set of electronic documents having private information within the documents is disclosed. The method includes converting each electronic document to an image to generate a plurality of images. The method also includes forming a set of images from the plurality of images. The method also includes determining a location collection of private pixels for each pair of images within the set of images. The method also includes determining a subset of images from the set of images according to the location collection of private pixels. The method also includes generating an average image from the subset of images. The method also includes generating a difference array for at least one location of private pixels with the average image. The method also includes blurring the average image. The method also includes copying the pixels of the blurred average image to the location of private pixels to generate a representative image of the plurality of images. The representative image includes no private information identified by the private pixels.

A method for generating a representative electronic document representing a plurality of electronic documents also is disclosed. The method includes determining a subset of images of the plurality of electronic documents based upon differences between pixels within each image. The differences relate to private information within the electronic documents. The method also includes calculating an average image from the subset of images. The method also includes determining at least one location of proven-private pixels within the average image. The method also includes determining at least one location of probable-private pixels within the average image. The method also includes blurring pixels within the locations of the probable-private and proven-private pixels. The method also includes randomly moving the blurred pixels within a region around the locations of the probable-private and proven-private pixels. The method also includes copying the blurred pixels into the average image to generate a representative image of the plurality of electronic documents.

BRIEF DESCRIPTION OF THE DRAWINGS

The accompanying drawings are included to provide further understanding of the disclosed embodiments and constitute a part of the specification. The drawings listed below illustrate embodiments of the claimed invention and, together with the description, serve to explain the principles of the invention, as disclosed by the claims and their equivalents.

DETAILED DESCRIPTION OF THE PREFERRED EMBODIMENTS

Figure 1A:
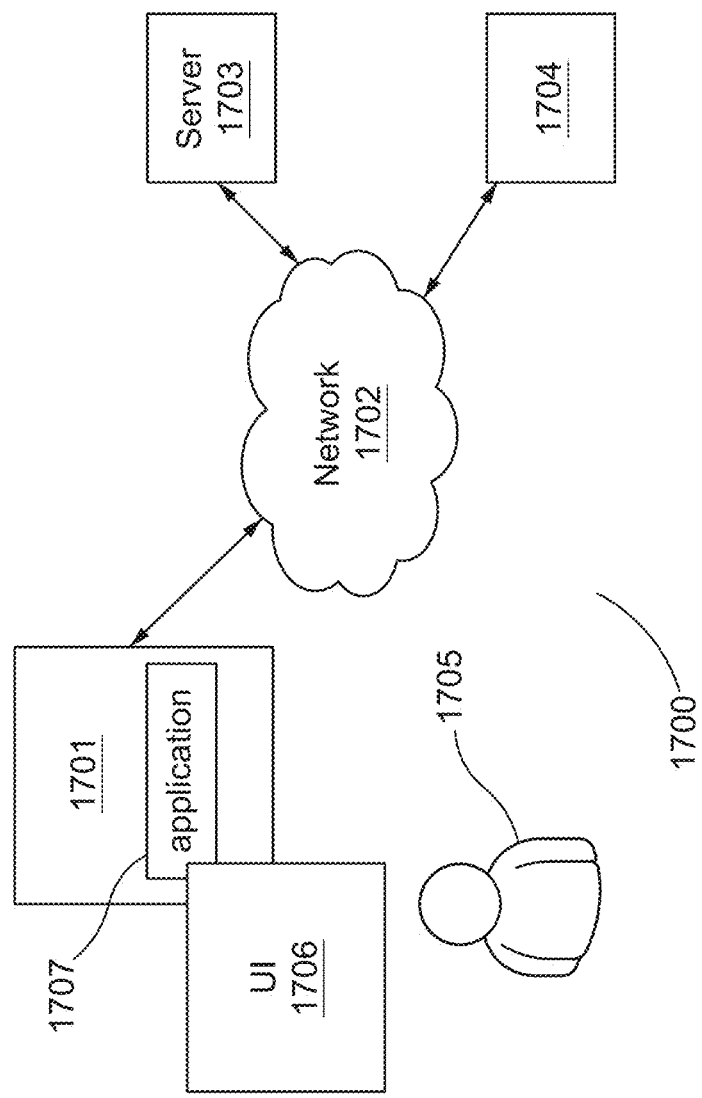
FIG. 1A illustrates a block diagram of a system for sending and delivering an email according to the disclosed embodiments.

Aspects of the invention are disclosed in the accompanying description. Alternate embodiments of the present invention and their equivalents are illustrated without parting from the spirit or scope of the present invention. It should be noted that like elements disclosed below are indicated by like reference numerals and the drawings.

The use of electronic documents, such as email messages, involves the exchange of digital information from an author to one or more recipients. Email is a critical component in an application for communication between a company and its users. Effective emails help businesses bring more people to their websites and to promote their goods/services. Sometimes, those emails include offers, links, graphics or other information specific to the user, as well as private information such as name, email address, and the like. A recipient does not receive a generic email, but a personalized one.

Thus, an automated email-imaging or electronic document-imaging system and associated methods are disclosed for generating a privatized or anonymized single image based upon a set of similar, but distinct, image captures having obfuscated, or blurred, private information and imagery. A process executed by such a system includes capturing an image of each private electronic document. The process also includes temporary encrypted storage of each private electronic document image. The process also includes determining a subset of most-similar documents using probable- and proven-private pixel count differences. The process also includes generating obfuscated (or blurred), but discernable-in-context, imagery derived from the probable- and proven-private portions of the most-similar images set. The process also includes combining not-private portions with the obfuscated imagery in the probable- and proven-private portions of the most-similar images subset to create a representative image that contains no private information or imagery. The process also includes watermarking the probable- and proven-private portions of the representative image with text or imagery in order to further denote the redacted areas. The process also includes generating and saving the representative output image digital file.

The probable- and proven-private pixels may be determined for a set of images by determining each position where pixels in all images are not identical. The proven-private difference set may be expanded to include probable-private locations via a configurable-distance buffer zone. These steps ensure coverage of coincidently-identical pixels.

The subset of the most-similar documents is determined by a location collection of probable- and proven-private pixels between each unique pairing of all private images. Images may be sorted by a metric of the lowest number of private locations between images in a pairing. The process then may keep only those images from pairings, above a configurable minimum number, that results in the lower numbers of private locations.

According to the disclosed process, the obfuscated (or blurred) portions of an image are generated by determining probable- and proven-private pixels, disclosed above, of the most-similar documents image set. The process then teaches creating an average image from the most-similar documents images. The process creates an average image from the most-similar documents images. Visual details of the average image, such as blurring, are reduced by blurring in its entirety. Further processing of the average image occurs by randomly sweeping around pixels within the now-blurred average image within configurable distance boundaries so pixels of artifacts maintain a position that is close to their original position so as to be partially discernible without representing the original information or imagery.

According to the disclosed embodiments, the combination of not-private portions with the obfuscated imagery in the probable- and proven-private portions is performed by creating a copy of the average image as the beginnings of a representative image. Further action includes the overlayment of the representative image, in locations where probable- and proven-private pixels exist, with the obfuscated imagery.

FIG. 1 depicts a block diagram of a system 1700 for sending and delivering an email according to the disclosed embodiments. System 1700 includes a computing device 1701 operably connected to a network 1702 to communicate with one or more servers, such as server 1703. Computing device 1701 also communicates with other computing devices, such as computing device 1704 using system 1700 and network 1702. Additional computing devices may be included in system 1700. In other words, computing device 1701 may be connected any number of computing devices to exchange information.

Network 1702 may be a cellular network, such as those for a wireless device, a point-to-point dial up connection, a satellite network, the internet, a local area network (LAN), a wide area network (WAN), a wireless (WiFi) network, an ad hoc network, and the like. Such networks may be used to connect various types of network elements, such as hubs, bridges, routers, switches, servers, and gateways. Network 1702 may include one or more connected networks, such as a multi-network environment, including public networks, such as the internet, or private networks, such as a secure enterprise private network. Access to network 1702 may be provided via one or more wired or wireless access networks.

Computing device 1701 may be a personal computer, such a desktop or laptop computer, a personal digital assistant (PDA), a mobile device, a smart device, a tablet, and the like. Computing 1701 may be seen in greater detail below with respect to computing system 1800.

Server 1703 may be an enterprise server, cloud-based server, dedicated server, host server, and the like. Certain aspects of computing system 1800 may be representative of server 1703. Other computing devices, such as computing device 1704, may be a personal computer, a personal digital assistant (PDA), a mobile device, a smart device, a tablet, and the like. Computing device 1704 is used to access a server, such as server 1703, and communicate with computing device 1701 and other computing devices over network 1702.

Computing devices 1701 and 1704 may be any type of computer system that provides its user the ability to load and execute software programs and the ability to access network 1702 to communicate with one or more servers 1703. It should be noted that communications between devices may occur over multiple networks, for example, cellular and wireless networks.

Computing device 1701 is configured to receive input from a user 1705, using a user interface 1706. User interface 1706 may be keyboard, touch screen, voice activated device, mouse, and the like that is operably coupled to computing device 1701. Computing device 1701 also may include a display, such as a computer monitor, that is configured to display one or more user interfaces 1706. In some embodiments, the display may be a touchscreen. At least some of user interfaces 1706 include fields for initiating or continuing communications with one or more entities, generally referred to as potential recipients or contacts. For example, an email application is stored on computing device 1701 as a client-side application.

In another embodiment, user 1705 may access a web-based email application, instant messaging application, and the like using a standard internet browser, or application, 1707. The interface of application 1707 may be displayed to user 1705 within the internet browser. Thus, application 1707 is used to compose an email or other document or initiate a communication and may be a client-side application or a non-client side, or web-based, application.

When application 1707 is launched, user interface 1706 for the email application may be presented to user 1705. User 1705 may prepare a message via user interface 1706 that is to be sent to one or more recipients. Similarly, the recipients may view a received message via a user interface on computing device 1704. With the particular arrangement of user interface 1706 and input field options may vary across different applications and products, the disclosed embodiments are applicable to any user interface wherein a message may be composed.

Figure 1B:
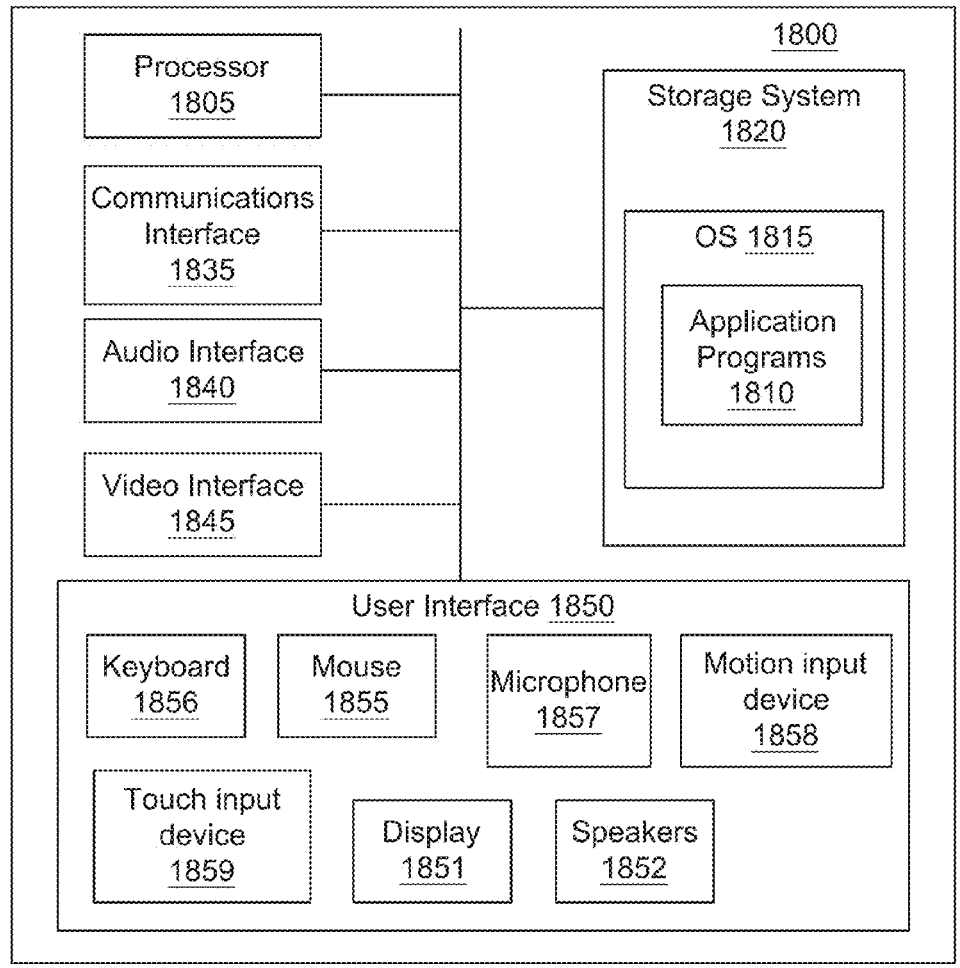
FIG. 1B illustrates a block diagram of components of a computing device according to the disclosed embodiments.

FIG. 1B depicts a block diagram of components of a computing device 1800 according to the disclosed embodiments. Computing device, or system, 1800 may be implemented within a single computing device or distributed across multiple computing devices or sub-systems that cooperate in executing program instructions. Device 1800 may be used to implement a myriad of computing devices, such as a personal computer, a personal digital assistant (PDA), a mobile device, a smart device, a tablet, and the like. Device 1800 may correspond to computing device 1701 or 1704 disclosed above.

Device 1800, for example, includes processor 1805 that processes data according to the instructions of one or more application programs 1810. Application programs 1810 interact with device operating system (OS) 1815. Examples of processors 1805 include general purpose central processing units, application specific processors, and logic devices, as well as any other type of processing device, combinations, or variations thereof.

Application programs 1810, OS 1815, and other software may be loaded into and stored in storage system 1820. Device OS 1815 may control and coordinate the functions of the components of device 1800. This feature provides an easier manner for applications to connected with lower level interfaces like the network interface. It should be noted OS 1815 may be implemented both natively on computing device 1800 and on software visualization layers running atop the native device. Virtualized OS layers may be used to provide additional, nested groupings within OS 1815 space, each containing an OS, application programs, and application product interfaces (APIs).

Storage system 1820 may include any computer readable storage media readable by processor 1805 and capable of storing software and program instructions, such as application programs 1810 and OS 1815. Storage system 1820 may include volatile and non-volatile, removable and non-removable media implemented for storage of information, such as computer readable instructions, data structures, program modules, or other data. Examples of storage media include random access memory (RAM), read only memory (ROM), magnetic disks, optical disks, flash memory, virtual memory and non-virtual memory, magnetic cassettes, magnetic tape, magnetic disk storage, or other magnetic storage devices, or any other suitable storage media. In addition to storage media, storage system 1820 may include communication media over which software may be communicated internally or externally. Storage system 1820 may be implemented as a single storage device by also may be implemented across multiple storage devices or sub-systems co-located or distributed relative to each other. Storage system 1820 may include additional elements, such as a controller, capable of communicating with processor 1805.

Software may be implemented in program instructions to be executed by device 1800 in general or processor 1805 in particular. These program instructions may direct device 1800 or processor 1805 to operate in a specified manner. The program instructions turn a computer into a special purpose machine in order to perform specified functions according to the disclosed embodiments. When loaded into processor 1805 and executed, the software or program instructions transform device 1800 from a general-purpose computing device into a special-purpose computing device customized to generate a representative electronic document for a plurality of electronic documents, such as emails, having private information.

The components of device 1800 may be included in a system-on-a-chip device. These components may include processor 1805, communications interface 1835, and at least some of the memory associated with storage system 1820. Other components of device 1800 include audio interface 1840 and video interface 1845. Audio interface 1840 may be a microphone, while video interface 1845 includes a camera along with associated programs to capture video or picture data for storage on device 1800. These interfaces create data files that may be retrieved later by application programs 1810.

Communications interface 1835 may include communications connections and devices that allow for communication with other computing systems over one or more communication networks. Examples of connections and devices that together allow for inter-system communication may include network interface cards, antennas, power amplifiers, RF circuitry, transceivers, and other communication circuitry. The connections and devices may communicate over communication media, such as metal, glass, air, or any other suitable communication media, to exchange communications with other computing systems or networks of systems. Transmissions to and from communications interface 1835 are controlled by OS 1815. OS 1815 may inform applications and APIs of communication events when necessary.

Figure 1C:
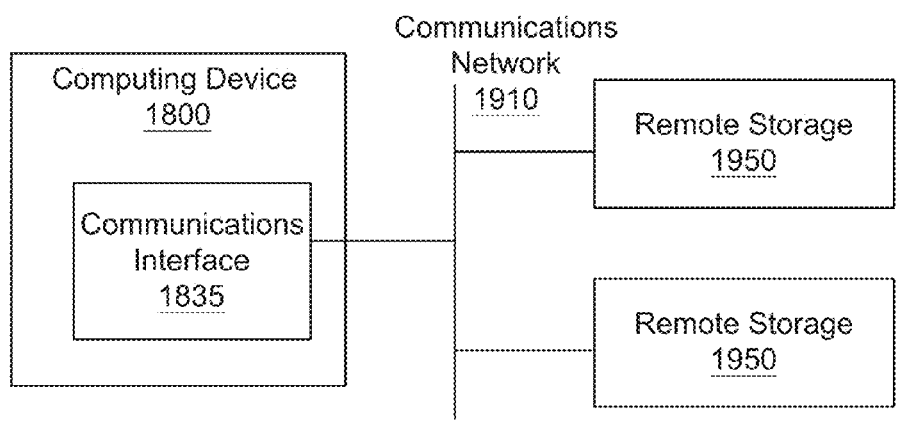
FIG. 1C illustrates an architecture having several network devices according to the disclosed embodiments.

According to some embodiments, data or programming instructions utilized by device 1800 may be stored thereon. As shown in FIG. 1C, data or programming instructions may be stored on any number of remote storage platforms 1950 that are accessed by device 800 over communication network 1910 via communications interface 1835. Remote storage platforms 1950 might include a server computer in a distributed computing network, such as the internet. Remote storage platforms 1950 also may include "cloud storage providers" whose data and functionality are accessible to applications through OS functions or APIs.

User interface 1850 may include an input device such as a mouse 1855, keyboard 1856, microphone 1837, track pad or touch input device 1859 for receiving a touch gesture from a user, a motion input device 1858 for detecting non-touch gestures and other motions by a user, and other types of input devices along with associated processing elements capable of receiving user input. Output devices such as display 1851, speakers 1852, haptic devices for tactile feedback and other types of output devices may be included in user interface 1850. In some embodiments, the input and output devices may be combined in a single device, such as a touchscreen display, which both depicts images and receives touch gesture input from user 1705.

Visual output may be depicted on display 1851 in several manners. Display 1851 may present graphical user interface elements, text, images, video, notifications, virtual buttons, virtual keyboards, and the like. User interface 1850 also may include associated user interface software executed by OS 1815 in support of the various user input and output devices.

Such software assists OS 1815 in communicating user interface hardware events to application programs 1810 using defined mechanisms.

According to a first example process, the user of first computing device 1701 sends the email to each email recipient after the email is generated. The email is processed by host server 1703 in route to second computing device 1704. Processes associated with server 1703 may cause a sub-message to be appended to the email. For example, a company standard promotion or other information may be added to the email. A logo or graphic for the company may be added. After the sub-message is appended, the email is delivered through network 1702 to each recipient. Alternatively, a URL or any other information may be appended to the email.

Figure 2:
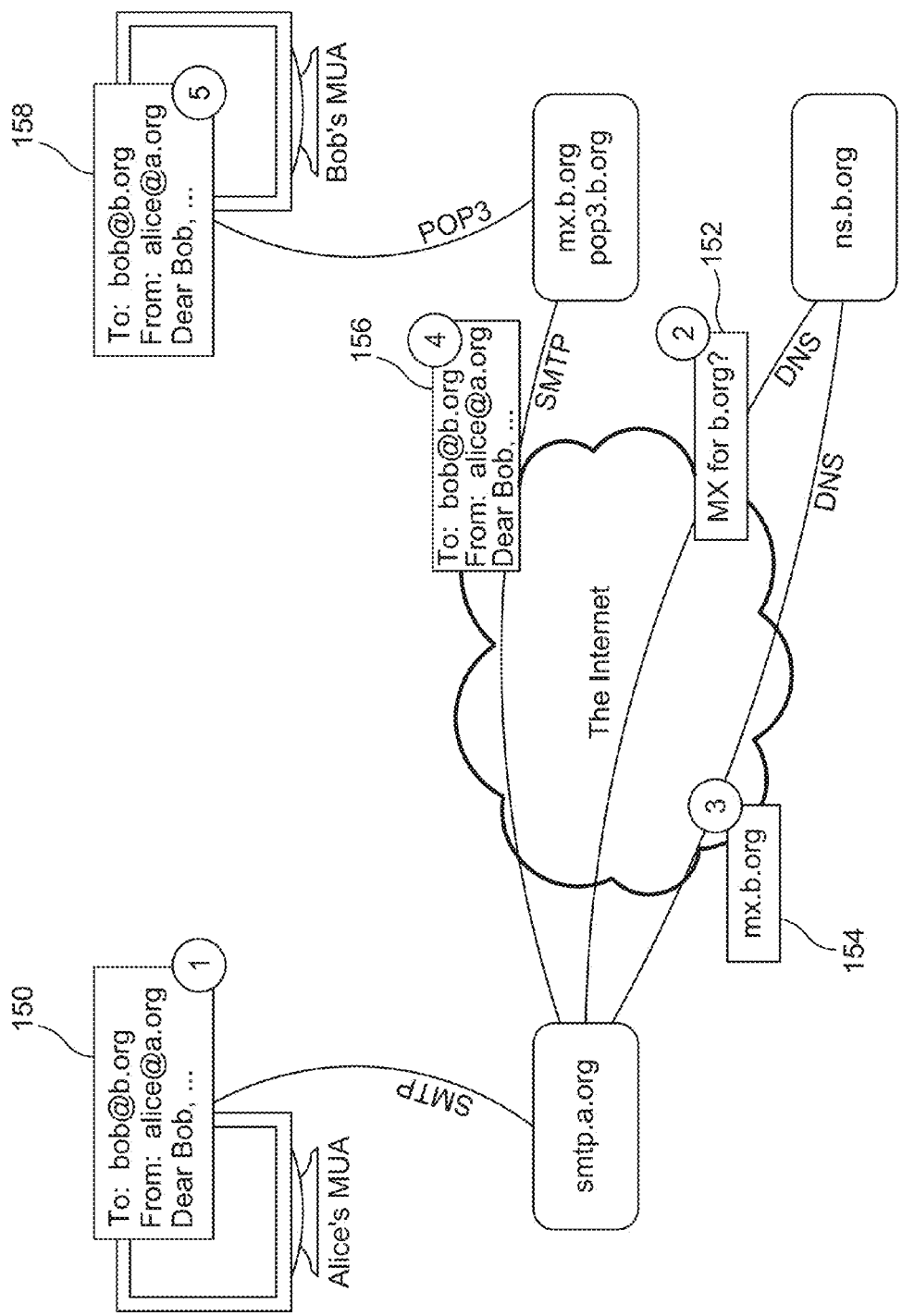
FIG. 2 illustrates the process of sending and receiving an email according to the disclosed embodiments.

This process may be shown in greater detail by FIG. 2. FIG. 2 depicts a sequence of events when a user sends an email message, or an electronic document, over the Internet. In block 150, a user Alice types in, or selects from an address book, the email address of the intended recipients, types a message having information, and hits the "send" button using a mail user agent (MUA). The MUA for Alice may be first client computer 102 shown in FIG. 1. Alice's MUA formats the message into an Internet or computer network email format and may use the Simple Mail Transfer Protocol (SMTP) to send the message to the local mail transport agent (MTA), in this case smtp.a.org, managed by Alice's Internet Service Provider (ISP).

The MTA reads the destination address provided by SMTP, in the example shown as bob@b.org, and, in block 152, looks up the associated domain name in the Domain Name System (DNS) to find the mail exchange servers accepting messages for that domain. In block 154, the DNS server for the b.org domain, or ns.b.org, responds with a mail exchange (MX) record listing the MX servers for that domain, which in this example is mx.b.org, a server run by the recipient's ISP. In block 156, Alice's MTA, or smtp.a.org, sends the message to mx.b.org using SMTP, which delivers it to the mailbox of user Bob (or other users, if applicable). In block 158, Bob presses the "get mail" button in his MUA that retrieves the message using POP or another suitable protocol.

This procedure also may be used for sending electronic documents apart from emails. For example, a document may be generated asking for private information from the recipients. Upon receipt, the information is used to fill out the document, which is stored on a system connected to a network, such as a work environment. Thus, the electronic documents are not sent back as emails, but stored individually. The collection of electronic documents may be processed according to the disclosed embodiments to suppress the private information.

Figure 3A:
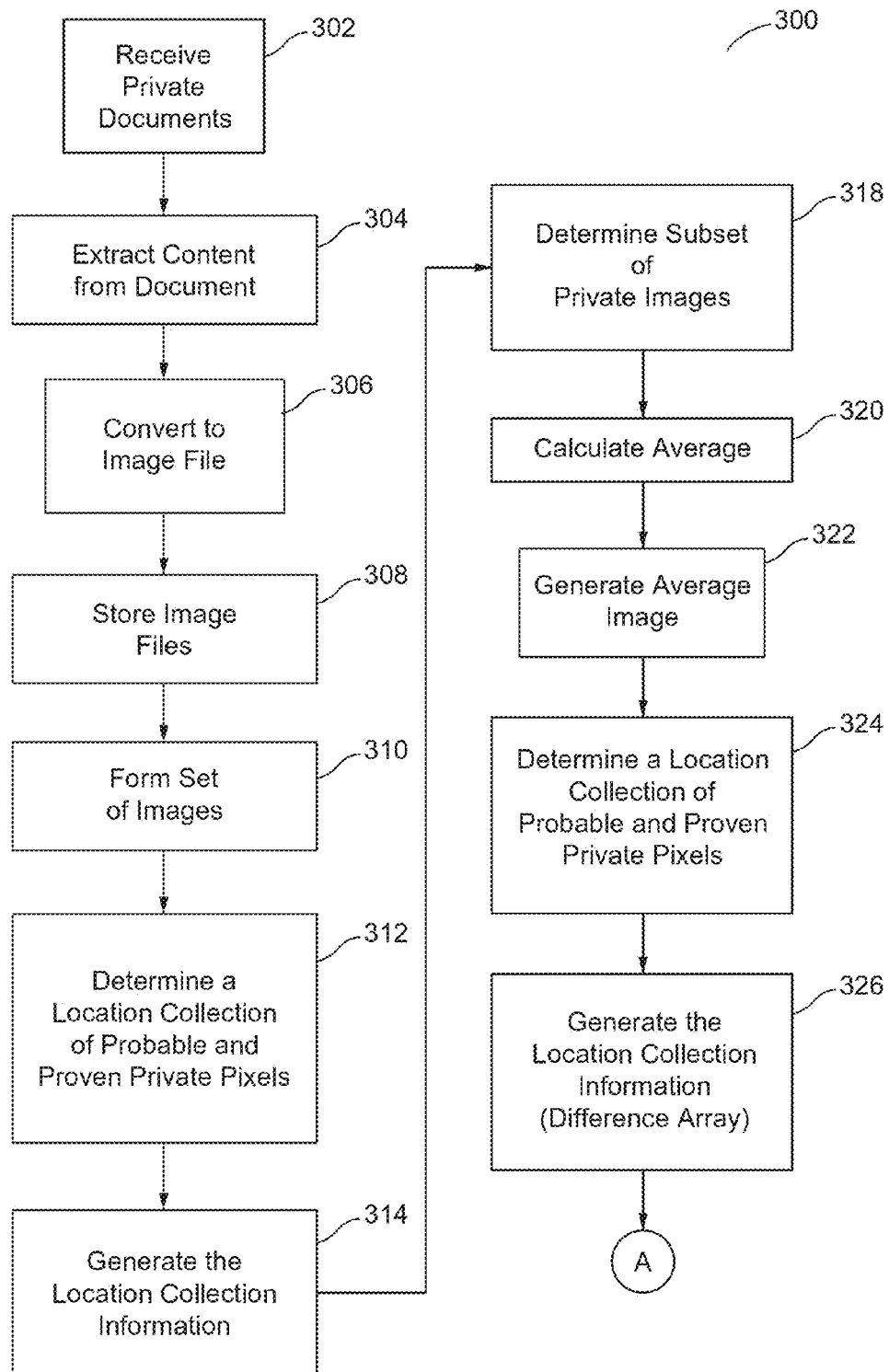
FIG. 3A illustrates a flowchart for generating a privatized email from a plurality of emails having private information according to the disclosed embodiments.
Figure 3B:
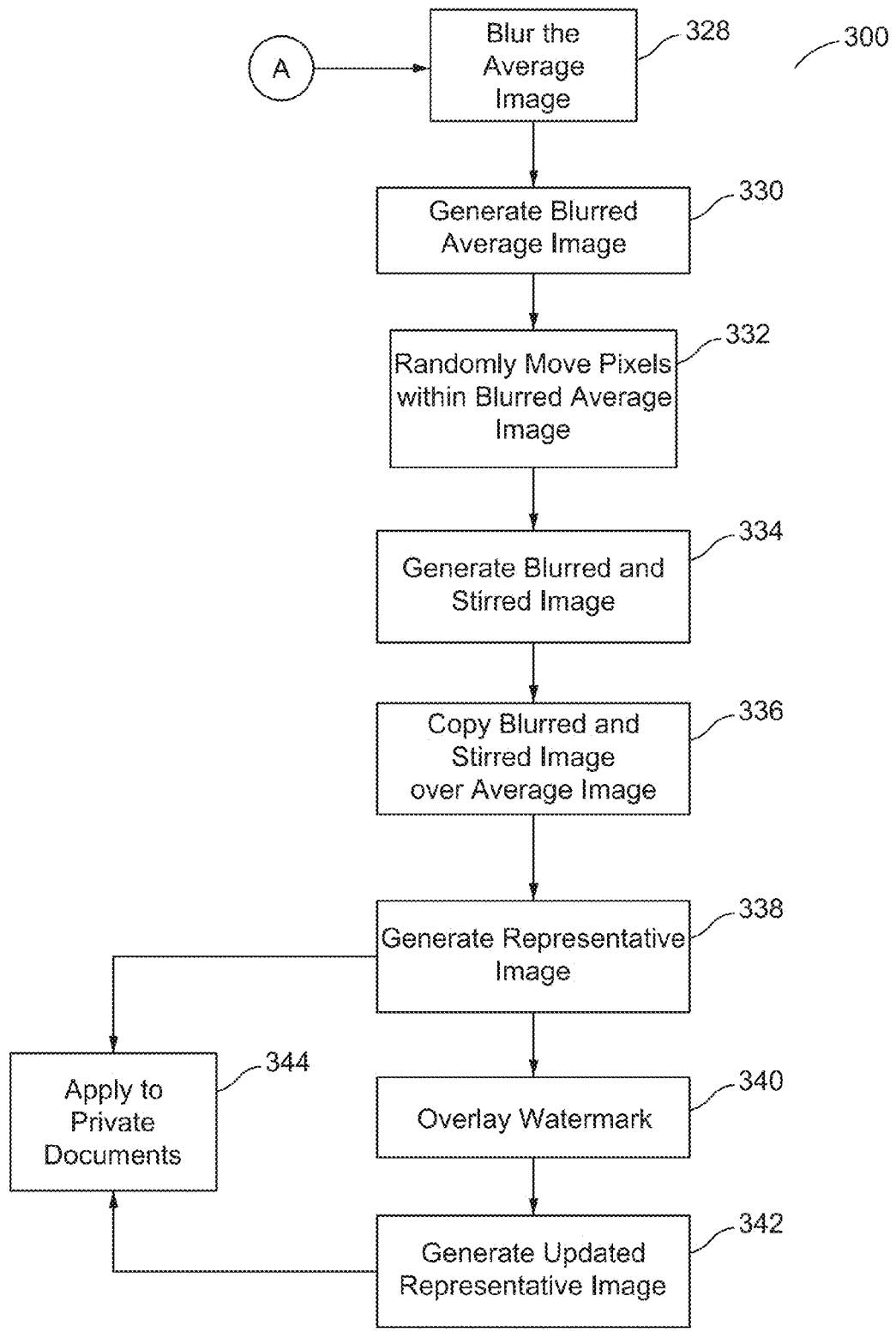
FIG. 3B further illustrates the flowchart for generating a privatized email from a plurality of emails having private information according to the disclosed embodiments.

FIGS. 3A and 3B depict a flowchart 300 for generating a privatized, or anonymized, email from a plurality of emails having private information according to the disclosed embodiments. The steps and functions disclosed by FIG. 3 may be performed using the features disclosed above with regard to FIGS. 1A-C and 2. The embodiments disclosed by FIG. 3, however, are not limited to the systems, devices and the associated examples shown above. Further, the disclosed embodiments are not limited to email systems, but may include any electronic document exchange system. For example, electronic documents may be used in the following process to identify private information and modify the documents accordingly.

Step 302 executes by generating or receiving the private documents. In some embodiments, the private documents are emails, such as those generated as disclosed above. These documents are related in some manner, such as being sent by a company or associated to an email campaign having a common theme. The documents should have some portions in common, or related to each other in some manner. Examples include an offer for a product or group of products, confirmation of orders from a business, or advertisements having small differences tailored to the recipients.

Steps 304 and 306 execute by capturing an image of each document. In other words, a digitized version of each document is generated. Step 304 executes by extracting the hyper text markup language (HTML) content of the documents. Step 306 executes by converting the HTML content into an image file by way of rendering in a headless, automated browser. The image file correlates to each original document. Using the above examples, the document may be an email created and stored on a computing device. Alternatively, the image capture may relate to graphic images, such as a jpeg, in a computer-readable form. Step 308 executes by storing the generate images of the documents. Preferably, the storage of the images is temporary.

Step 310 executes by forming a set of private related images. Taking the plurality of emails is received or generated in step 302, step 310 makes a subset of the private images of the plurality of related images. A most common image of a document is determined to obtain the document with the least private information. The disclosed embodiments seek to group a set of emails with the least amount of redacted information based on the most common image. Thus, the disclosed embodiments pare down the batch of raw emails to a subset of emails most similar to each other.

For example, an email campaign may include a large number of different emails sent to a wide variety of recipients. The disclosed process may desire to only process a small set of email documents associated with the campaign to reduce computing overhead and storage requirements. For example, the disclosed process may identify 10 email documents for generating the privatized electronic document. It selects the email document with the least amount of private information or has the most amount of common information within the email documents. The remaining documents within the set are selected based their association with this email document.

Step 312 executes by determining a location collection of probable and proven-private pixels between the images for each unique pairing of all private images. Step 312 performs this by checking differences between pixels within pairs of images. Proven-private pixels pertain to those pixels within the images known to contain private information, such as a name or email address field. The pixels in these fields or locations within the image are determined to be different. A comparison of the images of the documents will show the differing pixels between these fields. Probable-private pixels are those pixels that probably differ between the subset of images in relation to the proven-private pixels. There is a probability, but not certainty, that these pixels contain private information. This relationship is disclosed in greater detail below.

Figure 3C:
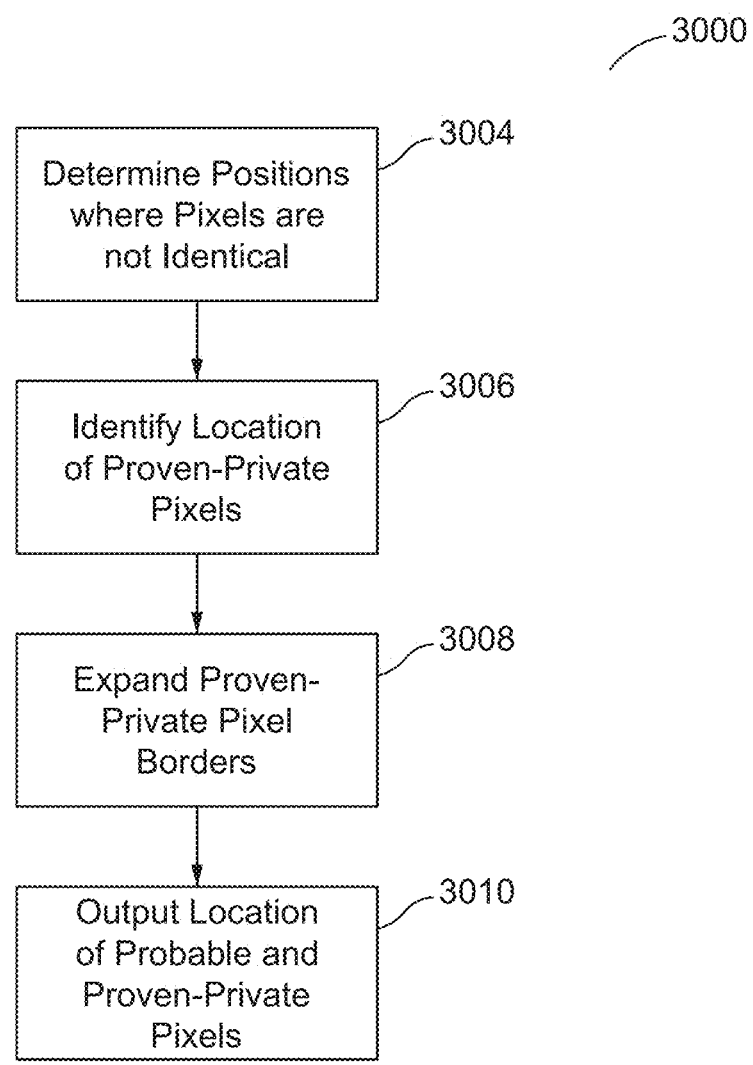
FIG. 3C illustrates a flowchart for determining the location collection of probable- and proven-private pixels between images according to the disclosed embodiments.

Step 312 may be further disclosed by FIG. 3C, which depicts a flowchart 3000 for determining the location collection of probable- and proven-private pixels between images according to the disclosed embodiments. Step 3004 executes by determining positions within the images where the pixels in all private images are not identical. In other words, there are differences between pixels in these locations between the images. Alternatively, there are pixels between the images that are identical. These differing pixels are determined to be proven-private pixels, and the locations are identified as shown in step 3006.

Step 3008 executes by expanding the proven-private pixel borders by a configurable distance to identify probable-private pixels. For example, the configurable distance may be 10 pixels from the border of the set of proven-private border pixels. Thus, the disclosed embodiments will "reach out" beyond those pixels determined to be different within the images and identify those that may be different. The distance to identify probable-private pixels may be set depending on how clean one wants the document. One does not want the entire email image to be considered private information. One, however, does not want too little probable-private pixels as the proven-private pixels may still reveal enough of the data to discern the private information. Further, additional probable-private pixels may be needed for later operations. The probable-private and proven-private pixel locations are output in step 3010. The process shown by steps 3004-3010 may be repeated in step 324, disclosed below.

Step 314 executes by generating the location collection of probable-private and proven-private pixels between each unique pairing of private images. Thus, each image will have a collection of pixels identified as being probable-private and proven-private pixels. This information also may be stored. It should be noted that one output image per pair of images in the set.

Step 318 executes by determining a subset of private images, referred to most-similar private images. This set is the one desired for continuing operations of the disclosed embodiments. Each pixel that is different may be scored within the images in order to determine which images to ignore. The most similar private images are determined. Preferably, the number of images of the documents is about 4 or 5.

Presumably, every pixel that differs between images relates to private information. Thus, a metric may be established to only include those private images that meet the metric. For example, if a certain percentage of pixels differ between images, or are identified as being within the private location collections, then they would be selected for this subset. This metric may be shown as [count of probable and proven-private pixels between the pair]/[count of all pixels in an image]. The outputs from step 314 are pared down to create the subset of most-similar images. The images with the highest sum of counts of private pixels when compared to others within the original set are removed until the number is whittled down to the target number of images remaining, such as 4 or 5. The disclosed embodiments generate a subset of the most-similar private images that have the most pixels in common with each other.

Step 320 executes by calculating an average image for the most-similar images subset. This average image serves as a baseline for the most-similar private image set. Examples of the average image are shown below. Each output pixel is the average color, brightness, luminance, and the like of the corresponding-coordinate pixels of the images in the subset. The average image for a set does not match any of the private images, and appears slightly blurred or obfuscated. Further, the average image is a transformed output. Image visibility also should still be crisp. Step 322 executes by generating the average image for output and use by the disclosed process.

Step 324 executes by determining a location collection of probable- and proven-private pixels between images for all most-similar images within the corresponding subset and the average image determined in steps 320 and 322. The process for performing this step is the same as the one disclosed for step 312 and by FIG. 3C, except the disclosed embodiments are looking for differences between the private images and the average image. Step 326 executes by generating a difference array, or the location collection information for probably and proven-private pixels. The difference array is the set that contains coordinates of each probable and proven-private pixel. Thus, each image will have a collection of pixels identified as being probable-private and proven-private pixels when compared to the average image. This information also may be stored. It should be noted that one output image per image in the most-similar private image subset.

Step 328 executes by blurring the average image. This feature is shown in greater detail below. One process of blurring the average image reduces, or compresses, the resolution of the image and then enlarges, or decompresses, the lower resolution image back to original size. The act of compression of data results in a lossy image. The lower resolution image retains the loss of discernible content. This process allows the resulting image to retain some of the semblance/feel of the original average image without betraying any private content. Step 330 executes by generating the blurred average image. Now, the image visibility is not so crisp, and details of the image are further obfuscated.

Step 332 executes by randomly moving around pixels within the blurred average image. This step moves the blurred pixels within a tight formation in a local region and may be referred to as "stirring" the image. Thus, pixels in the blurred average image are moved within a region close to their original location. Thus, the blurred average image retains some sense of the original blurred image and does not look bizarre or unappealing. The size of the region for local movement may be specified according to the disclosed embodiments. For example, pixels may be moved around in 5 by 5 pixel areas. Thus, the size of the region for the blurring process provides the need for a reasonable amount of probable-private pixels. Step 334 executes by generating the blurred and stirred average image.

Step 336 executes by copying the blurred and stirred image of step 334 over the average image at each location with the location collection of probable- and proven-private pixels. This result is shown in greater detail below. Step 338 executes by generating a privatized, representative image with probable- and proven-private pixels obfuscated, but with some indication about the original set of emails. Private information is not just blacked out, for example. A graphic or something resembling the obscured information is shown in the resulting private documents. One also can get a sense of the email campaign corresponding to the raw emails.

Steps 338 and 340 may be optional to add security or to enhance visual appeal with the privatized document. Step 338 executes by overlaying a watermark at each location of the probable- and proven-private pixels. Step 340 executes by generating a privatized, representative image with the probable- and proven-private pixels obfuscated and overlaid with the watermark. Thus, the privatized images will includes the blurred and stirred pixel images as well as a watermark to keep private information hidden but in a more pleasing and informational manner than blacked out or redacted images. The watermarked image is disclosed in greater detail below.

Step 344 also is an optional step and executes by applying, or associating, the privatized image to the private documents within the set. The privatized image of the emails may overlay various documents for security, if needed. The sections in the private document may be modified accordingly to reflect the use of the image to represent a displayable copy of the private document.

Figure 4:
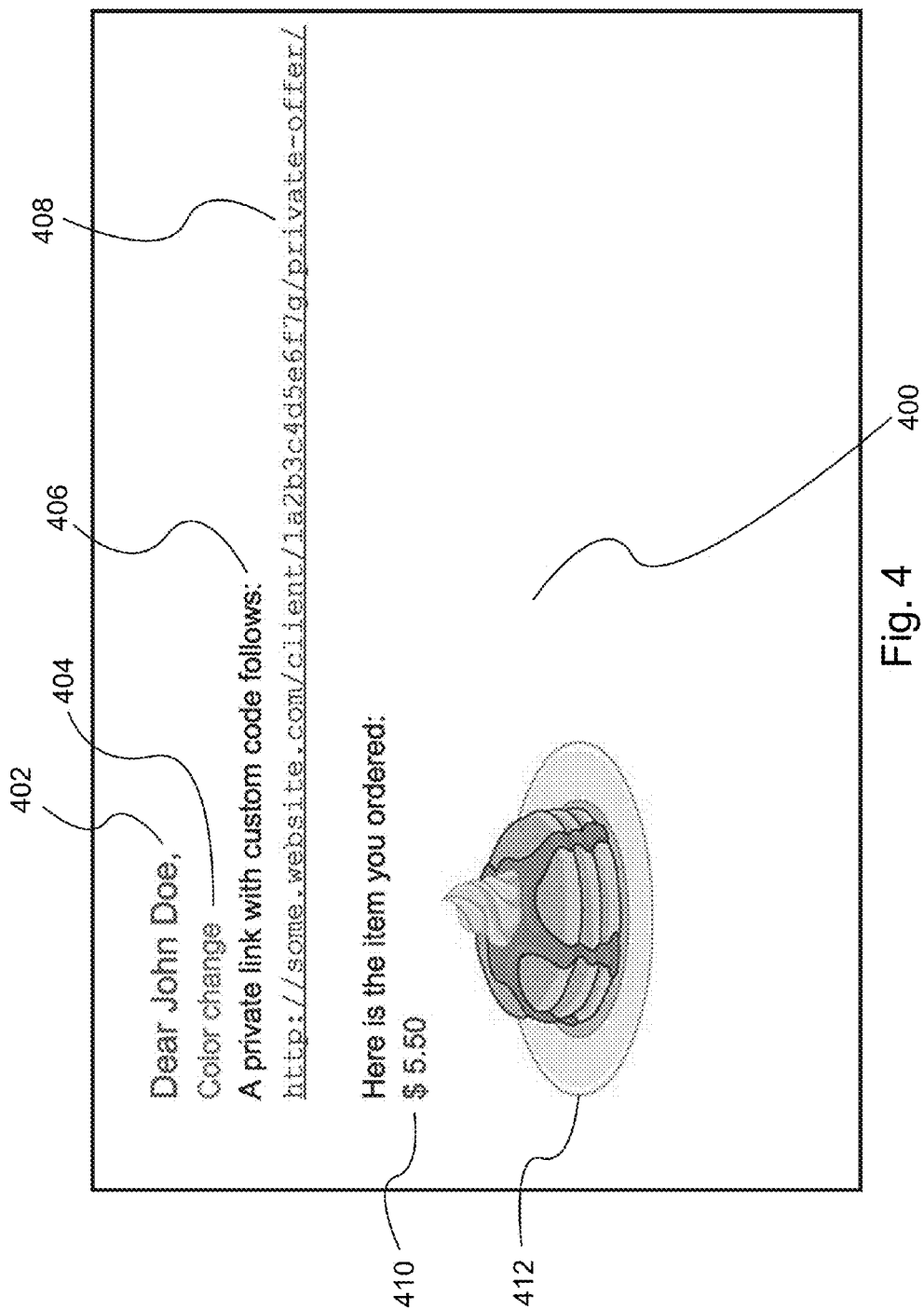
FIG. 4 illustrates an electronic document having a private image according to the disclosed embodiments.

FIGS. 4-13 depict an example of privatized images in an electronic document, such as an email, generated according to the process disclosed by FIG. 3. FIG. 4 depicts private image 400 having various images, text and fields. Preferably, private image 400 is an email received by a recipient. Private image 400 includes a name field, or name, 402, a color change field 404, text 406, and uniform resource locator (URL) 408. These features may be shown in the other private images of FIG. 5-7. Private image 400 also includes pricing information 410 and product graphic 412.

Figure 5:
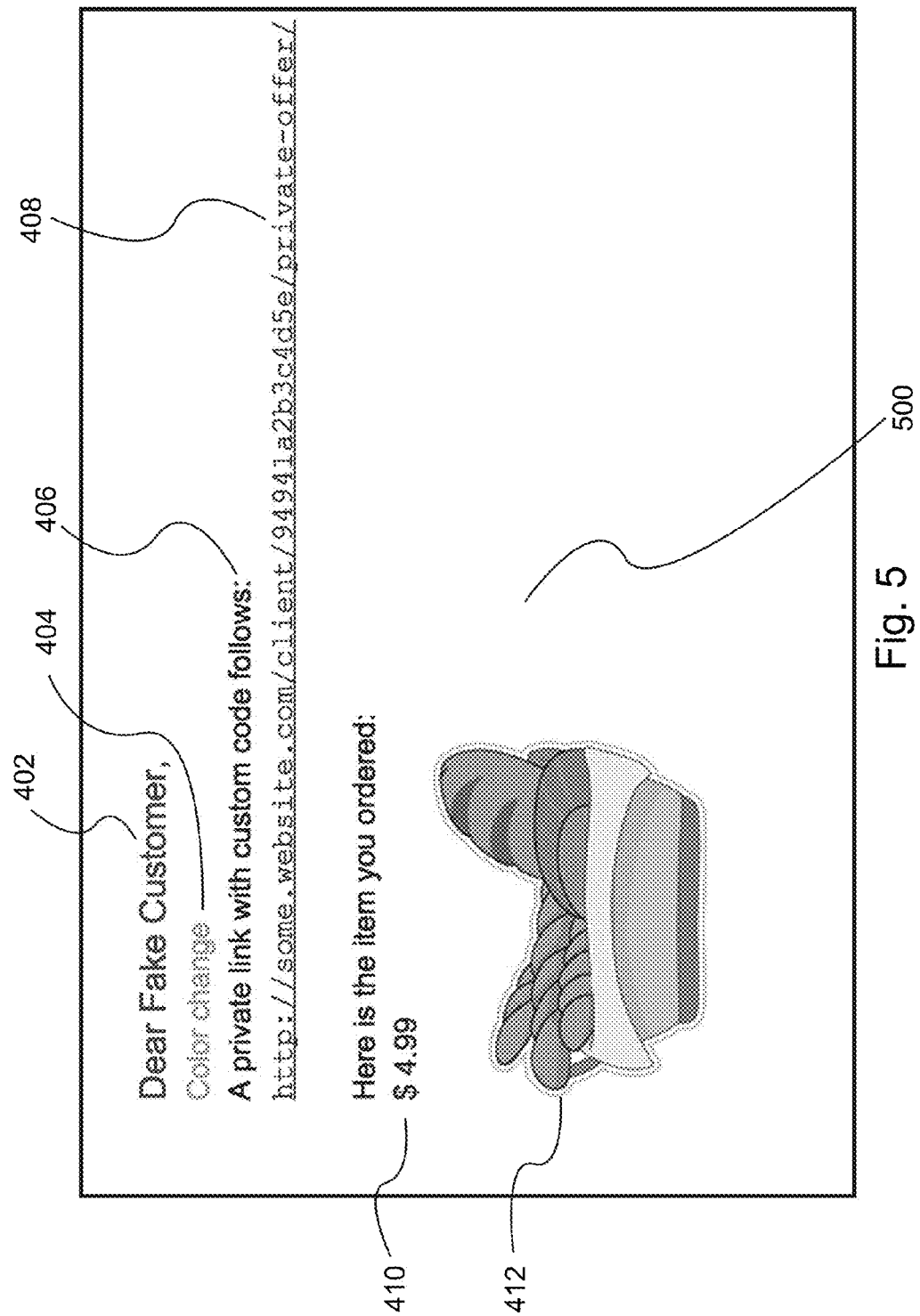
FIG. 5 illustrates another electronic document having a private image according to the disclosed embodiments.

Private image 500 of FIG. 5 also shows information for the fields and features disclosed by FIG. 4. As shown, the data for some of these fields differ from the data shown in private image 400. Thus, if the pixels for private image 400 and private image 500 are compared, the differences in these locations will be apparent, which should match private information, such as name, specific URL information to the recipient, price information and a graphic of the product ordered.

Figure 6:
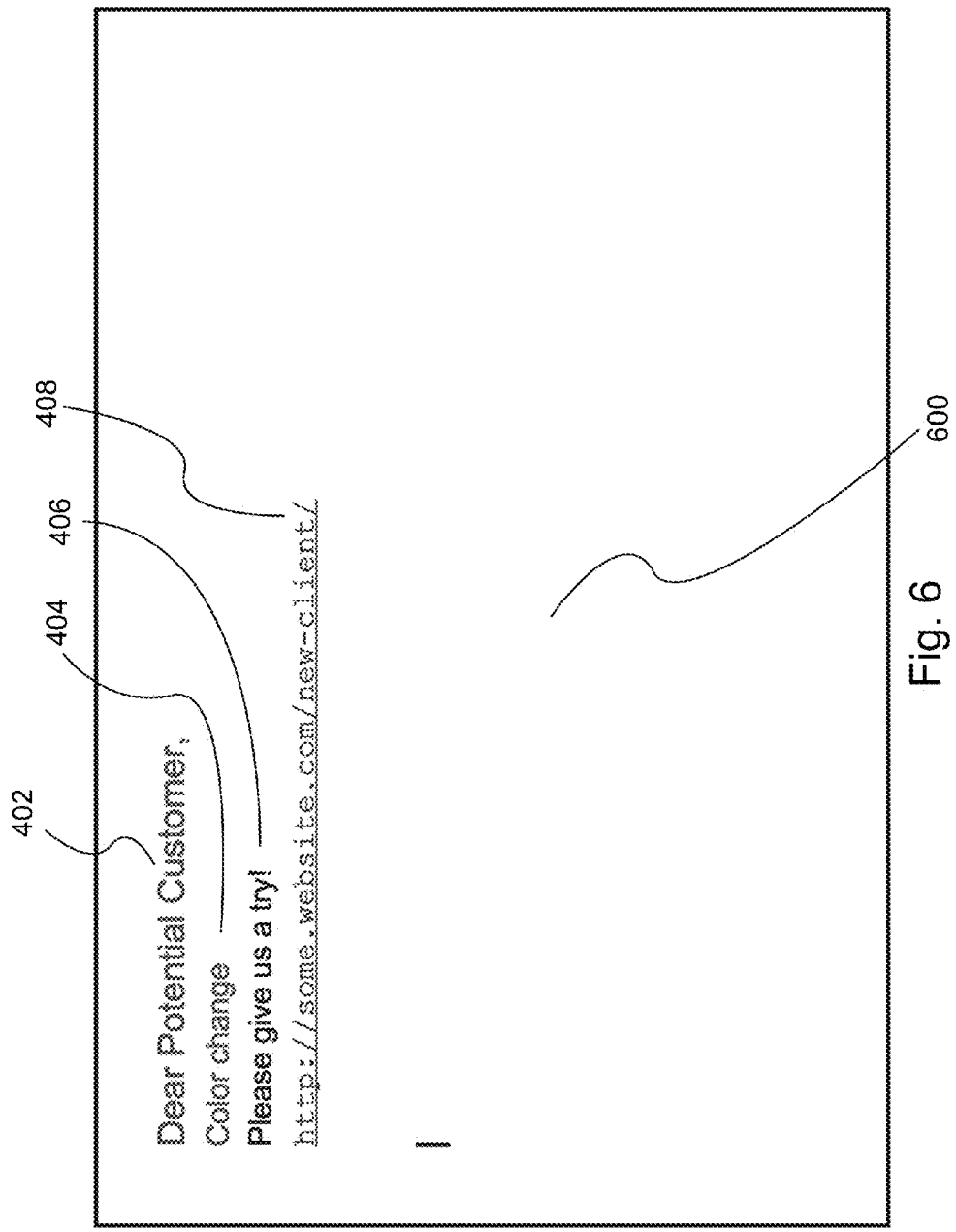
FIG. 6 illustrates another electronic document having a private image according to the disclosed embodiments.

FIG. 6 depicts private image 600 according to the disclosed embodiments. Private image 600 differs from private images 400 and 500 as it does not include all the fields or information that is shown in the other images. For example, private image 600 only includes name 402, color change 404, text 406 and URL 408.

Figure 7:
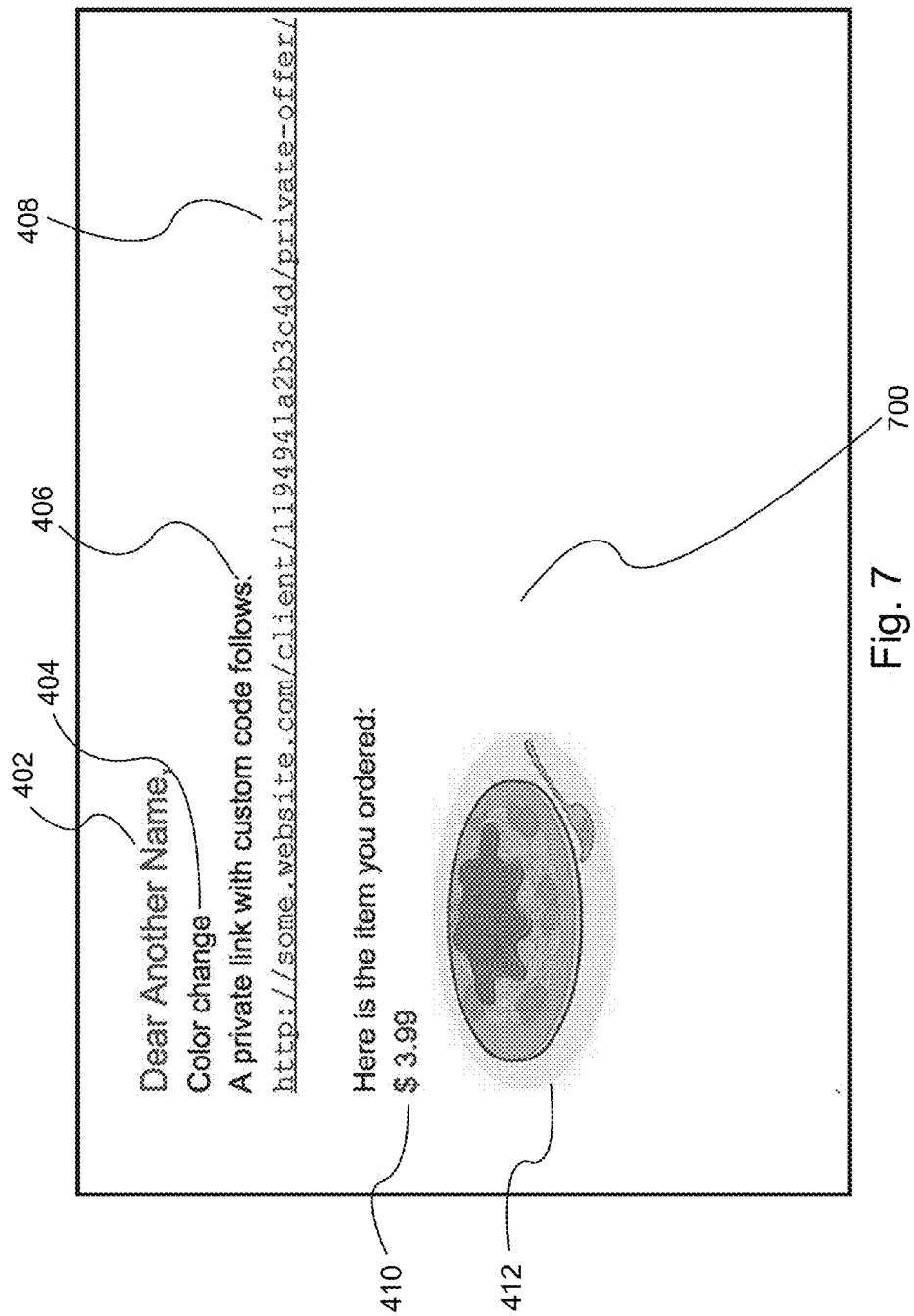
FIG. 7 illustrates another electronic document having a private image according to the disclosed embodiments.

FIG. 7 depicts private image 700 according to the disclosed embodiments. Private image 700 closely resembles private images 400 and 500 with different information, or pixels, for various fields and locations within the image. Using images 400, 500 and 700, an average image for the set of images may be generated.

Figure 8:
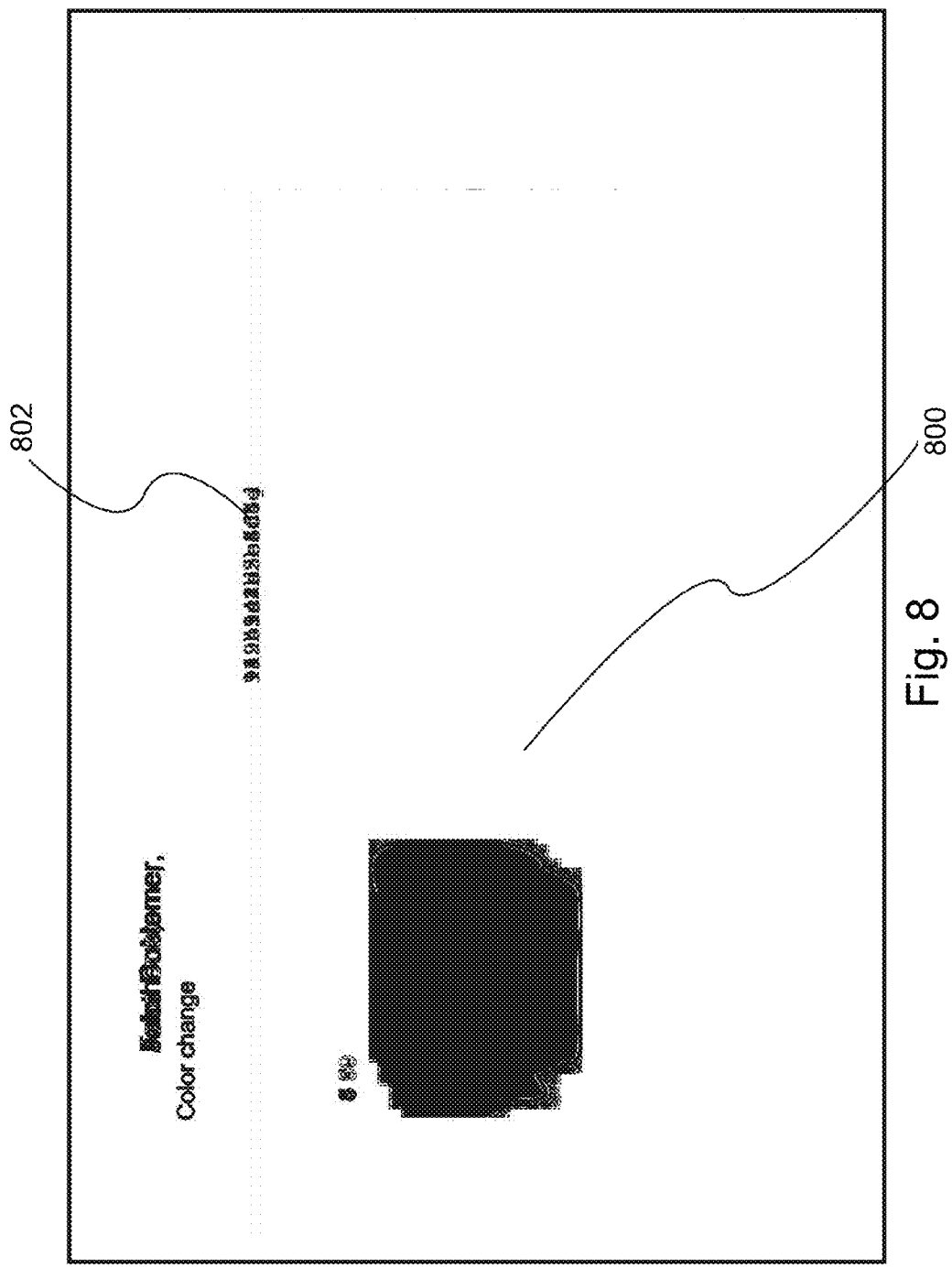
FIG. 8 illustrates the proven-private pixels of a most similar private image set according to the disclosed embodiments.

FIG. 8 depicts the proven-private pixels 800 of an average image of the most-similar private image set according to the disclosed embodiments. The most-similar private image set may include private images 400, 500 and 700. The disclosed embodiments may set a minimum number of images for a most-similar private image set, which in this example may be 3. Private image 600 is not included as it is the most-different private image as it is the most unlike image within the set. As can be seen, private image 600 does not include pricing information 410 or graphic 412. Thus, it has nothing to offer for those pixel locations in terms of blurring and stirring.

FIG. 8 shows where private information should be located within the private images. This private information, or proven-private pixels 802, is shown in the Figure by black for visualization. The blacked pixels appear to relate to the name, color change, a part of the URL, the pricing information and the graphic components seen in the private images. FIG. 8 may correspond with step 3004 shown in FIG. 3.

Figure 9:
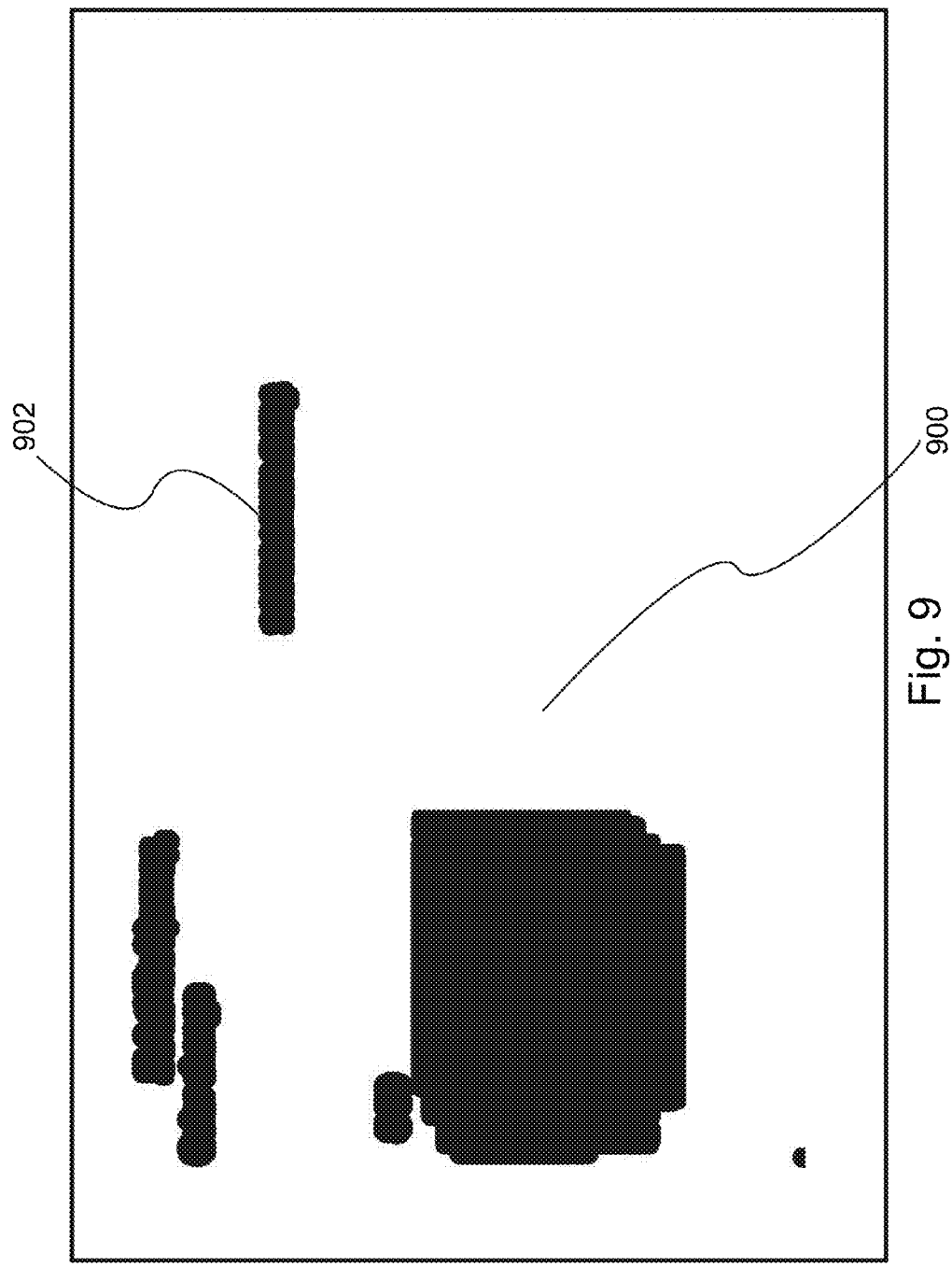
FIG. 9 illustrates the probable- and proven-private pixels within the image set according to the disclosed embodiments.

FIG. 9 depicts the probable-private pixels as well as the proven-private pixels for the average image according to the disclosed embodiments. A radius expansion process is performed from the border of the proven-private pixels to include nearby pixels in the disclosed process. Proven-private pixels 802 may have probable-private pixels 902 expand to make the private areas of pixels larger. As can be seen, gaps between groups of proven-private pixels are filled while the area within the average image tapped as having private information is enlarged. The size of the radius expansion to include probable-private pixels may depend on the size of the text or characters, and may be set or tuned according to the disclosed embodiments. FIG. 9 may correspond with step 3008 shown in FIG. 3.

Figure 10:
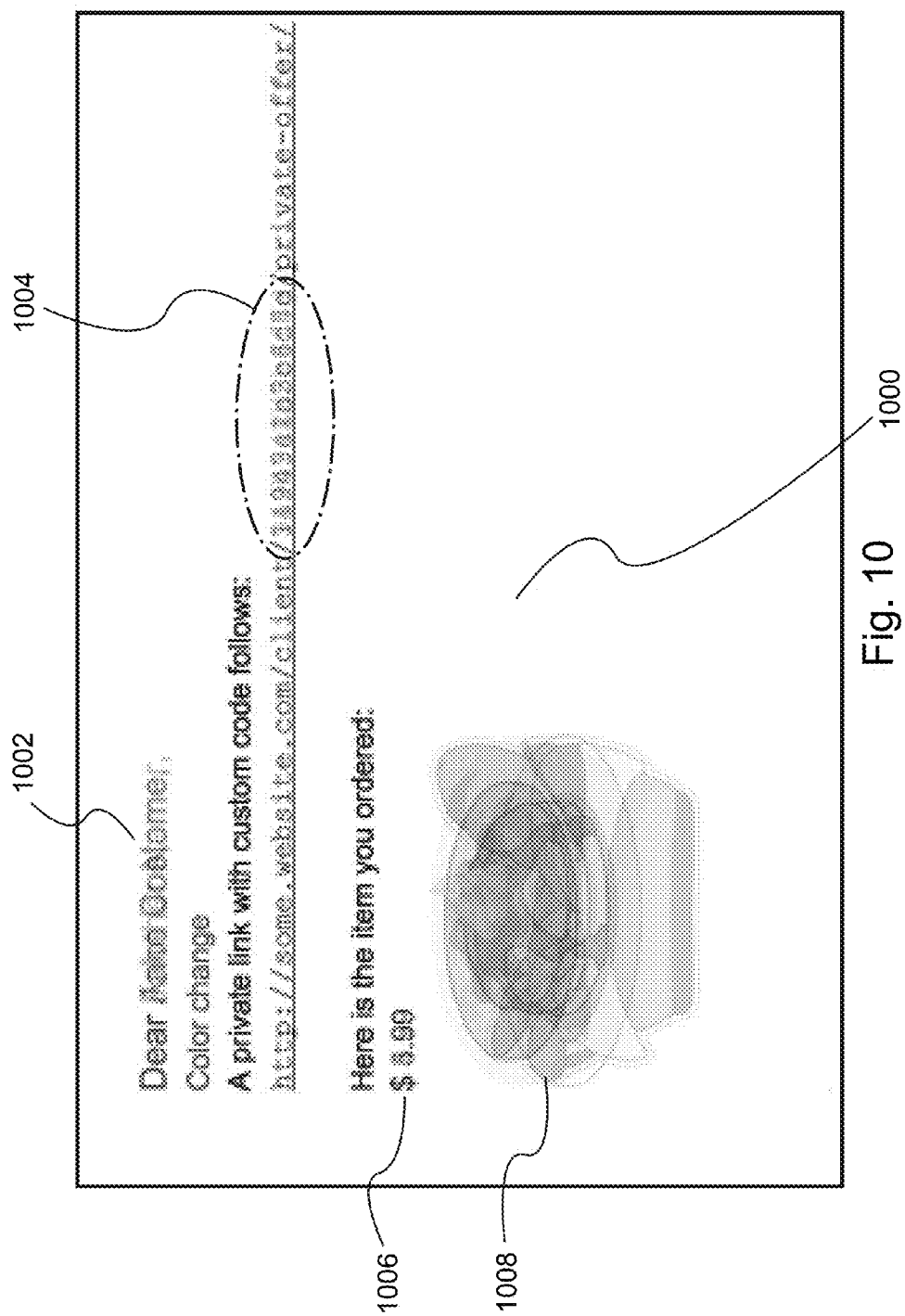
FIG. 10 illustrates a blurred average image according to the disclosed embodiments.

FIG. 10 depicts a blurred average image 1000 according to the disclosed embodiments. Using the areas identified as having probable- and proven-private pixels, the corresponding pixels within the average image of the set of private images 400, 500 and 700 are blurred. As shown in FIG. 10, these are areas 1002, 1004, 1006 and 1008. For blurred area 1004, the entire URL is not blurred because the non-blurred portions do not include private pixels, or information that changes between images.

At this point, there should be three sets of data resulting from the disclosed process. An average image of the image subset of the electronic documents, a difference array of identified probable- and proven-private pixels (as shown in FIG. 9), and the blurred average image shown in FIG. 10.

Figure 11:
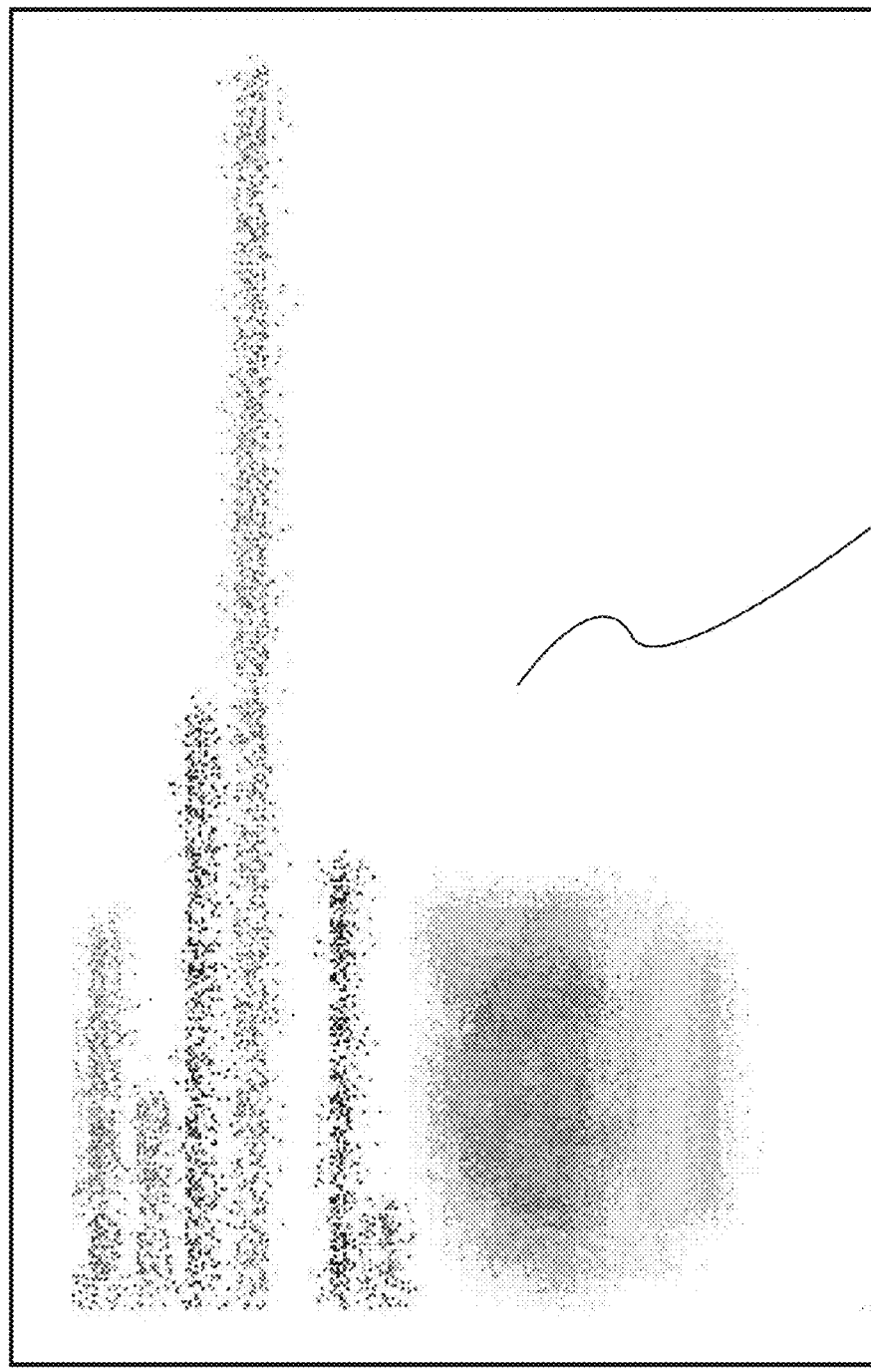
FIG. 11 illustrates a blurred and stirred (obfuscated) average image according to the disclosed embodiments.
Figure 12:
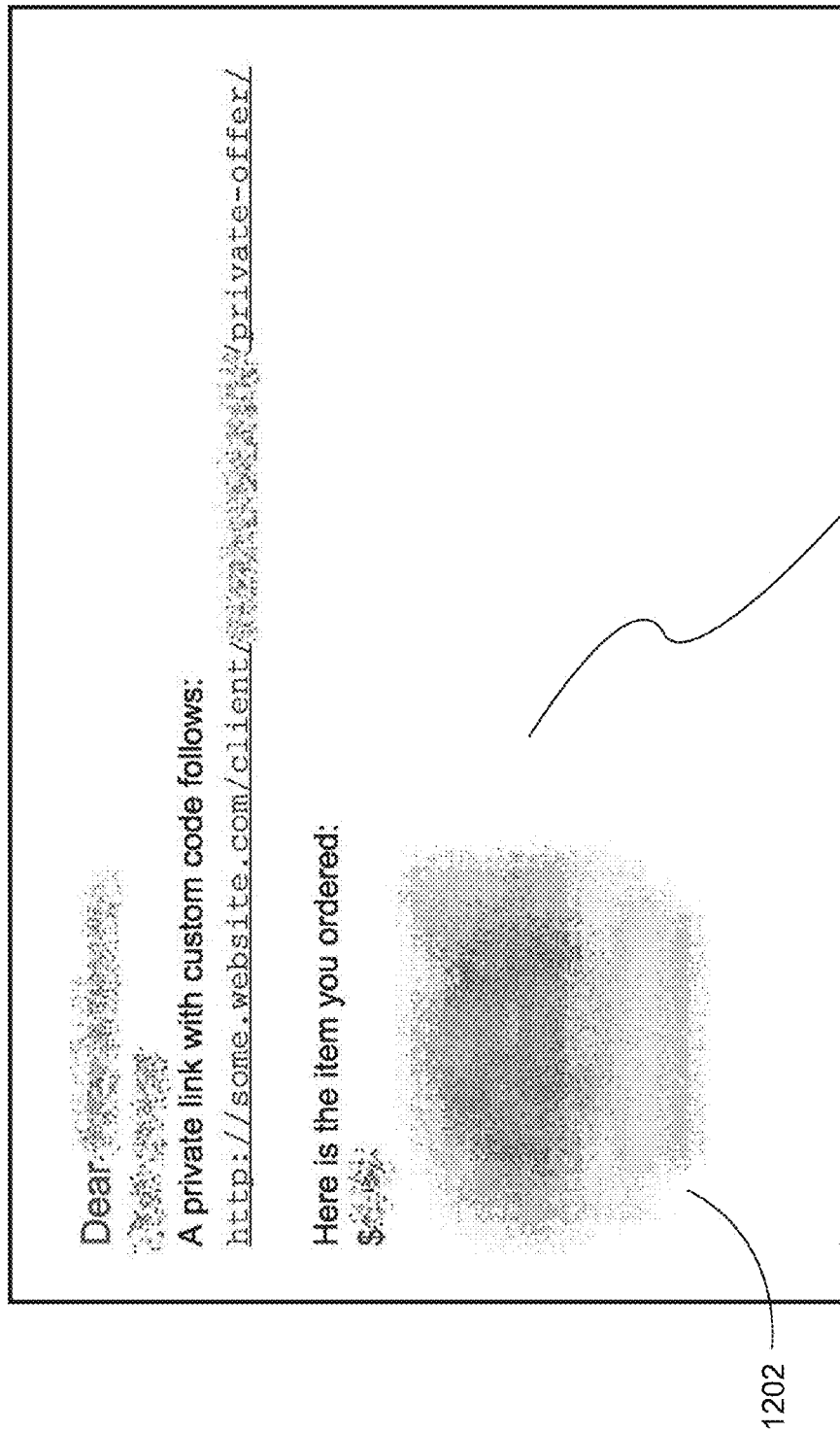
FIG. 12 illustrates the combined average image overlayed with the blurred and stirred average image in probable- and proven-private pixel locations according to the disclosed embodiments.

FIG. 11 depicts a blurred and stirred image 1100 according to the disclosed embodiments. Image 1100 is generated by moving around the pixels of the image within their local region to further obfuscate the information within the pixels. FIG. 12 depicts a privatized image 1200 that is generated from the combined average image overlaid with the blurred and stirred pixels in image 1100 in the identified probable- and proven-private pixel locations. As can be seen, inclusion of the probable-private pixel locations in the overlay produces a better representation of the private images while providing some level of certainty about the private information. For example, blurred and stirred area 1202 appears to relate to a graphic of some sort, though it does not specifically identify to what the graphic pertains.

Thus, image 1200 would be representative of the set of emails initially received. Instead of three different images, one would see image 1200 but without any private information.

Figure 13:
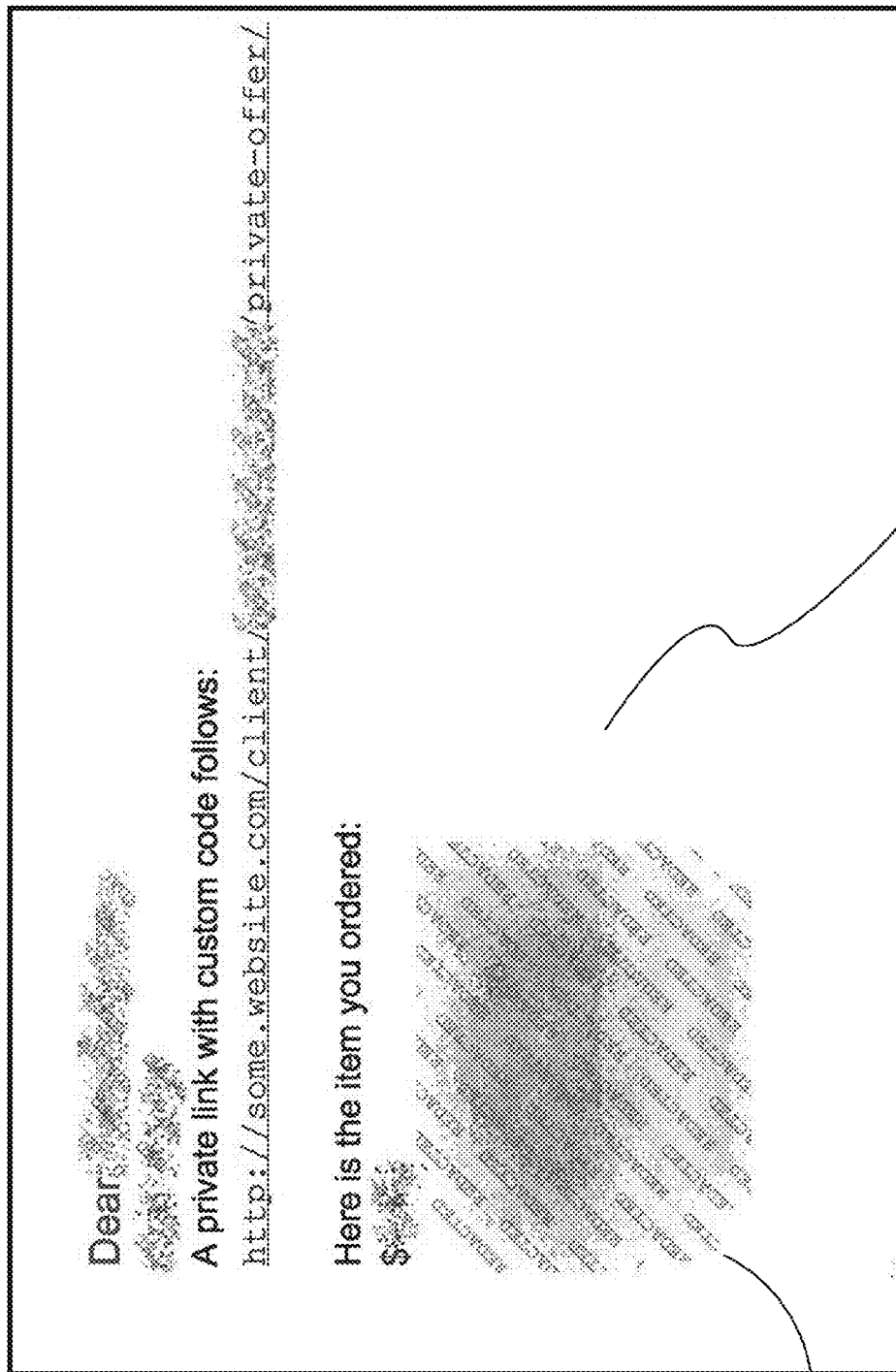
FIG. 13 illustrates the image shown in FIG. 12 with the overlayed watermark image according to the disclosed embodiments.

FIG. 13 depicts an image 1300 having a watermark 1302 also overlaid onto the probable- and proven-private pixels with the blurred and stirred portions according to the disclosed embodiments. The watermark feature provides a more professional looking image as well as indicating why the overlaid information is not visible.

According to the disclosed embodiments, a set of electronic documents, such as emails, may be received. The documents include private information located in different portions of the images. A subset of images is determined to represent the set of images having the biggest amount of probable- and proven-private pixel locations. The subset is then used to generate an privatized image representative of the entire set with the private information blurred but still available for viewing.

The disclosed embodiments may be supported and executed on a platform that has access to a network. The platform may support software and executable programs to provide the functionality disclosed above. For instance, the software may be deployed. Any software embodying the disclosed algorithm and its processes may be deployed by manually loading directly to the client, server and proxy computers via loading a storage medium such a CD, DVD, flash memory, chip, downloadable program and the like. The software also may be automatically or semi-automatically deployed into a computer system by sending the process software to a central server or a group of central servers. The software is downloaded into the client computers that execute the programs and instructions associated with the software.

Alternatively, the software may be sent directly to the client system via email. The software may be detached to a directory or loaded into a directory by a button on the email that executes a program that detaches the software into a directory. Another alternative is to send the software directly to a directory on the client computer hard drive. When there are proxy servers, the disclosed embodiments will select the proxy server code, determine on which computers to place the proxy servers' code, transmit the proxy server code, and install the proxy server code on the proxy computer. The software may be transmitted to the proxy server and then stored on the proxy server.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this specification, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more computer systems coupled to a network capable of exchanging information and data. These computer systems also may be general-purpose computer systems. Various functions and components of the computer system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications and variations can be made in the disclosed methods and systems for monitoring email transactions without departing from the spirit or scope of the invention. Thus, it is intended that the present invention covers these modifications and variations disclosed above provided that such modifications and variations come within the scope of any claims and their equivalents.

The invention claimed is:

1. A method for generating a privatized image corresponding to a set of electronic documents having private information within the documents, the method comprising:
converting each electronic document to an image file to generate a plurality of image files;
forming a set of images from the plurality of image files, wherein the set of images includes private pixels containing private information within the electronic documents;
determining a location collection of the private pixels for each unique pair of images within the set of images;
determining a subset of private images from the set of images according to the location collection of private pixels;
generating an average image from the subset of private images;
generating a difference array for at least one location of private pixels within the average image;
blurring the average image; and
copying the pixels of the blurred average image to the location of private pixels to generate a representative image of the plurality of images, wherein the representative image includes none of the private information identified by the private pixels.

2. The method of claim 1, further comprising stirring the pixels within the blurred average image by randomly moving around the pixels.

3. The method of claim 1, further comprising overlaying a separate image onto the pixels of the blurred average image at the location of the private pixels, wherein the separate image contains no pixels from the average image or the blurred average image.

4. The method of claim 1, wherein the generating the difference array includes determining a location collection of the private pixels between each private image within the subset of private images and the average image.

5. The method of claim 1, wherein the generating the difference array step includes determining at least one proven-private pixel at the at least one location.

6. The method of claim 5, further comprising determining at least one probable-private pixel based on the at least one proven-private pixel.

7. The method of claim 1, wherein the electronic documents are emails.

8. The method of claim 1, wherein private pixels include probable-private pixels and proven-private pixels.

9. The method of claim 8, wherein proven-private pixels include pixels that differ between the set of images.

10. A method for generating a representative electronic document representing a plurality of electronic documents, the method comprising:
determining a subset of private images within the plurality of electronic documents based upon differences between pixels within each private image pair, wherein the differences relate to private information represented by the pixels within the electronic documents;
calculating an average image from the subset of images;
determining at least one location of proven-private pixels within the average image;
determining at least one location of probable-private pixels within the average image;
blurring pixels within the locations of probable-private and proven-private pixels;
randomly moving the blurred pixels within a region around the locations of probable-private and proven-private pixels; and
copying the blurred pixels into the average image to generate a representative image of the plurality of electronic documents.

11. The method of claim 10, further comprising determining a location collection of the private pixels for the plurality of electronic documents to determine the differences between the pixels.

12. The method of claim 10, further comprising overlaying a separate image onto the blurred pixels, wherein the separate image contains no pixels from the average image or the blurred pixels.

13. The method of claim 10, wherein the determining the at least one location of probable-private pixels within the average image includes identifying a group of pixels adjacent the at least one location of proven-private pixels.

14. The method of claim 10, further comprising converting the plurality of electronic documents into the subset of private images.

15. A computing device for generating a privatized image corresponding to a set of electronic documents having private information within the documents, the computing device comprising one or more processors, one or more computer-readable storage devices, and program instructions stored on at least one of the one or more computer-readable storage devices for execution by at least one of the one or more processors, wherein the program instructions configure the one or more processors to convert each electronic document to an image file to generate a plurality of image files;

form a set of images from the plurality of image files, wherein the set of images include private pixels containing private information within the electronic documents;

determine a location collection of the private pixels for each unique pair of images within the set of images;

determine a subset of private images from the set of images according to the location collection of private pixels;

generate an average image from the subset of private images;

generate a difference array for at least one location of private pixels within the average image;

blur the average image; and copy the pixels of the blurred average image to the location of private pixels to generate a representative image of the plurality of images, wherein the representative image includes none of the private information identified by the private pixels.

16. The computing device of claim 15, further comprising program instructions, stored on at least one of the one or more computer-readable storage devices for execution by the one or more processors to configure the one or more processors to stir the pixels within the blurred average image by randomly moving around the pixels.

17. The computing device of claim 15, further comprising program instructions, stored on at least one of the one or more computer-readable storage devices for execution by the one or more processors to configure the one or more processors to overlay a separate image onto the pixels of the blurred average image at the location of the private pixels, wherein the separate image contains no pixels from the average image or the blurred average image.

18. The computing device of claim 15, further comprising program instructions, stored on at least one of the one or more computer-readable storage devices for execution by the one or more processors to configure the one or more processors to generate the difference array by determining a location collection of the private pixels between each private image within the subset of private images and the average image.

* * * * *